Inventor
Andrew Stamberger
by Sommers & Young
Attorneys

Oct. 20, 1959  A. STAMBERGER  2,909,745
ELECTRO-MAGNETIC CARBON PILE REGULATORS
Filed Dec. 18, 1956  3 Sheets-Sheet 3

Inventor
Andrew Stamberger
by Sommers + Young
Attorneys

United States Patent Office 2,909,745
Patented Oct. 20, 1959

2,909,745

ELECTRO-MAGNETIC CARBON PILE REGULATORS

Andrew Stamberger, Brockley, London, England, assignor to J. Stone & Company (Deptford) Limited, Deptford, London, England Original application December 22, 1953, Serial No. 399,794. Divided and this application December 18, 1956, Serial No. 629,135

Claims priority, application Great Britain December 31, 1952

4 Claims. (Cl. 338—8)

This application has been divided from and is a continuation of application Serial No. 399,794 filed on December 22, 1953, now Patent No. 2,828,395.

The invention concerns improvements relating to electro-magnetic carbon-pile regulators of the kind in which the compression in a pile is controlled by a rockable armature acted upon by a control spring and has for its object to provide simple but effective means for compensating for the influence upon the regulation of temperature variation in the magnet winding.

According to the invention, in a regulator of the kind set forth, a compensating bimetal device which is responsive to temperature variation of the magnet winding is arranged to reduce automatically the effective rate of the spring in response to increase in the temperature of the said winding. The bimetal device may be composite in its action in that it is adapted for reducing the force of the spring as well as its rate in response to increase in the temperature of the winding. By the effective rate of the spring is meant the amount by which its force will vary for a given movement of the armature.

With such temperature-compensation means, the matching of the magnet and spring forces in any position of the armature can be arranged to be substantially unaffected by changes in the magnet-exciting current due to temperature variation. The maintenance of greater constancy in the regulating action of the regulator can thus be attained.

A preferred embodiment of the invention will now be more fully described by way of example and with reference to the accompanying drawings, in which.

The regulator illustrated is more fully described in the Specification of the aforesaid application No. 399,794 and only so much of its construction and operation as are necessary for explaining the temperature-compensation device will be described below.

Figure 1:
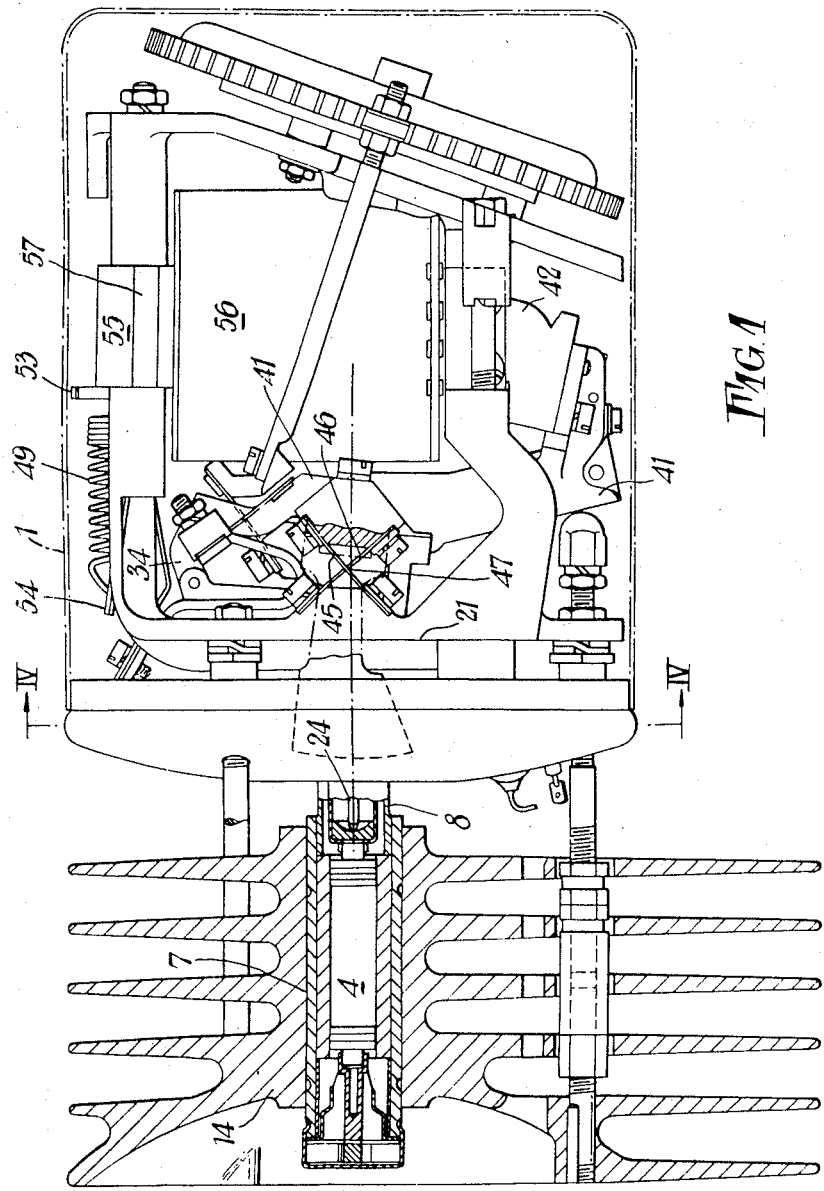
Figure 1 is a side elevation of a carbon-pile regulator with an enclosing can removed and with the pile shown in axial section.

The magnet system and pile-compressing mechanism are enclosed in a can 1 (shown by a chain line in Figure 1) and the carbon pile 4 in a tube 7 communicating with the can by way of a tubular extension 8, the whole being sealed and filled with an inert atmosphere. The tube 7 is surrounded by a finned heat-dissipating jacket 14.

The magnet system consists of a horseshoe magnet 55 clamped to a supporting structure 21 and carrying a winding 56 and an armature 42 carried by a clapper structure 41 pivotally mounted on the supporting structure 21 by means of a hinge comprising crossed leaf springs 45, 46. The clapper structure acts upon the carbon pile 4 through a strut 24 in such a manner as to reduce the compression in the pile as the armature 42 is attracted by the magnet 55. Attraction of the armature is opposed by the main control spring of the regulator which may be a helical tension spring 49 as shown, or a plurality of such springs, disposed substantially parallel to the prolonged axis of the pile 4, but near the cylindrical wall of the can 1.

The fixed anchorage 50 for the spring can be set and adjusted by means of a nut 51 on a screw 52 mounted in a cross piece 53 secured to the fixed structure 21. The movable anchorage 54 of the spring, which acts upon the clapper structure 41 through a bimetal temperature-compensation device hereinafter described, may be arranged, as shown, so that the virtual lever arm with which it acts about the axis 47 decreases with extension of the spring 49. This arrangement reduces the necessity for using a spring with a low rate, which would be difficult to accommodate, and also permits of the use of a longer spring.

Figure 5:
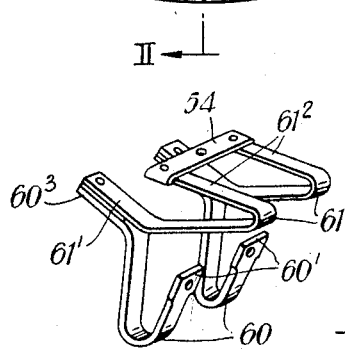

For the connection to the bimetal device, the clapper structure 41 extends beyond the hinge axis 47, that is upwardly, to a point near the main spring 49. The bimetal device, by varying the effective action of the spring, compensates for change of resistance of the magnet winding due to temperature variation. The device illustrated comprises two pairs of bimetal hairpin strips, 60 and 61 respectively (Figure 5). The first pair of strips 60 is connected at its ends $60^1$ by screws $60^2$ to the upper end 34 of the clapper structure 41 and at the other ends $60^3$ by screws $60^4$ to the adjacent ends $61^1$ of the strips 61. The other ends $61^2$ of the latter are connected to a cross piece 54 constituting the movable anchorage for the spring 49. The higher-expansion sides of the bimetal strips 60, 61 are the outer sides of the hairpin shapes in both cases. With increase in the temperature, determined mainly by the temperature of the winding 56, the bimetal strips 60 will deflect so as to reduce the tension in the spring 49, while the strips 61 will deflect to reduce the length of the virtual lever arm about the axis 47 with which the spring acts on the clapper structure 41 and thus to reduce the effective rate of the spring. In this arrangement, in any position of the armature 42, the strips 60 effect compensation for the reduction in the magnet torque, resultant upon the decrease in current due to the increase resistance of the winding 56 at the increased temperature, while the strips 61 effect compensation for the reduction in the rate of change of magnet torque with armature travel which also results from the reduction in current. The compensation thus to be provided will naturally depend upon the characteristicstics of the magnet system. By this means, for example, regulation for constant voltage can be obtained which is substantially unaffected by temperature variation in the magnet winding 56.

Figure 2:
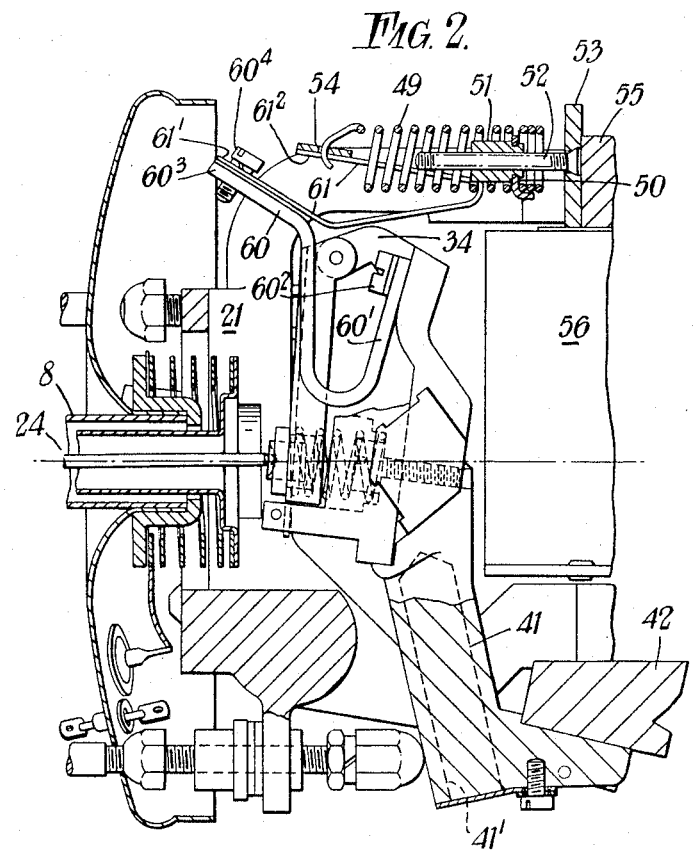
Figure 2 is an axial section, on the line II—II in Figure 4, through the pile-compressing mechanism, Figure 3 a plan view to a smaller scale and intended only to indicate the relative positions of the main components, Figure 4 a cross section on the line IV—IV in Figure 1, and Figure 5 a perspective view of a bimetal device.
Figure 3:
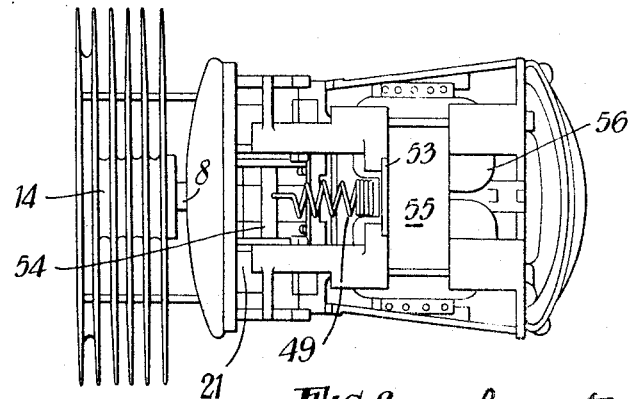
Figure 4:
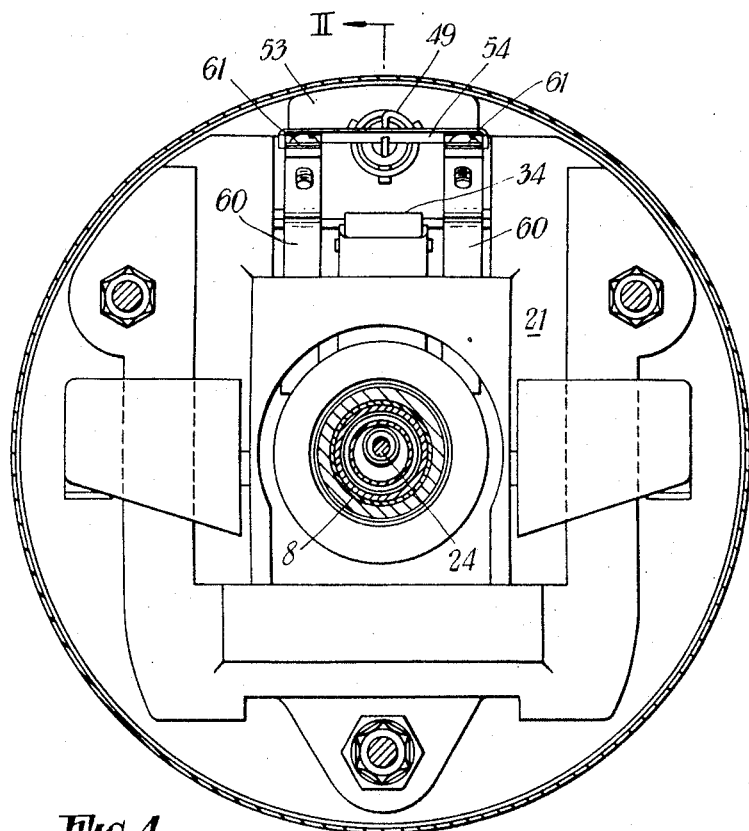

The bimetal device described may be arranged to be influenced by an auxiliary heater whose temperature rise is caused in known manner to be proportional to that of the winding. This heater may be housed, for example, in a bore in the clapper structure 41. A suitable position for this bore is indicated at $41^1$ in Figure 2. By this means, the heating of the device can be well matched to the heating of the winding. Alternatively or in addition, a resistance with a negative temperature coefficient may be employed connected in series with the winding 56. Close contact between this resistance and the winding may be obtained by winding the former into the latter or arranging it closely thereto on the inside or outside. This resistance may be shunted by a fixed resistance in order to modify the compensation effect in required fashion.

With an arangement such as has been described, it is advantageous to use a gas of high thermal conductivity, such as helium, in the enclosure in order to reduce the temperature gradient between the winding 56 and the bimetal device 60, 61.

We claim:

1. An electromagnetic carbon-pile regulator comprising a carbon pile, an electromagnet with an exciting winding and a rockable armature acting upon the said carbon pile for controlling the compression therein, a control spring acting on the said armature, and a compensating bimetal device operatively connected between said armature and said spring and located in position to be influenced by temperature variation of the magnet winding, the said bimetal device being oriented to act in substantially radial direction with respect to the axis of rocking of the armature to reduce automatically the effective rate of the spring in response to increase in the temperature of the said winding.

2. A regulator according to claim 1, wherein the bimetal device is composite in its action in that it is adapted for reducing the force of the spring as well as its rate in response to increase in the temperature of the winding.

3. A regulator according to claim 1, wherein the spring is a helical tension spring and the bimetal device comprises a pair of hairpin bimetal strips connected at one end to the armature and at the other end to one end of a second pair of hairpin bimetal strips whose other end is connected to a movable anchorage at one end of the spring, the first-named pair being arranged to impart to the anchorage a movement reducing the tension in the spring and the second-named pair being arranged to impart to the anchorage a movement reducing the effective length of the lever arm with which the spring acts on the armature, in each case in response to increase in temperature.

4. An electromagnetic carbon-pile regulator comprising a carbon pile, an electromagnet with an exciting winding and a rockable armature acting upon the said carbon pile for controlling the compression therein, a control spring acting on the said armature, and a compensating bimetal device operatively connected between said armature and said spring and located in position to be influenced by temperature variation of the magnet winding, said bimetal device being connected between said control spring and said armature so as to reduce the length of the effective lever arm with which the said spring acts upon the armature in response to increase in the temperature of the winding.

References Cited in the file of this patent

UNITED STATES PATENTS

| | | |
|---|---|---|
| 2,363,612 | Newton | Nov. 28, 1944 |
| 2,453,065 | Creveling | Nov. 2, 1948 |